US010272506B2

(12) United States Patent
Doumani et al.

(10) Patent No.: US 10,272,506 B2
(45) Date of Patent: Apr. 30, 2019

(54) RECIPROCATING TOOL WITH LINEAR GUIDES

(71) Applicant: Nanjing Chervon Industry Co., Ltd., Nanjing (CN)

(72) Inventors: Robert Doumani, Hoffman Estates, IL (US); Jaime Moreno, Imperial, CA (US); Ronald Arvey, Schaumburg, IL (US)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 0 days.

(21) Appl. No.: 15/366,840

(22) Filed: Dec. 1, 2016

(65) Prior Publication Data

US 2017/0157689 A1 Jun. 8, 2017

Related U.S. Application Data

(60) Provisional application No. 62/262,977, filed on Dec. 4, 2015, provisional application No. 62/297,471, filed on Feb. 19, 2016.

(51) Int. Cl.
*B23D 49/16* (2006.01)
*B25F 5/00* (2006.01)
*B23D 51/16* (2006.01)

(52) U.S. Cl.
CPC ........... *B23D 49/162* (2013.01); *B23D 51/16* (2013.01); *B25F 5/006* (2013.01)

(58) Field of Classification Search
CPC ........ B23D 49/162; B23D 51/16; B25F 5/006
See application file for complete search history.

(56) References Cited

U.S. PATENT DOCUMENTS

| 3,461,732 | A | * | 8/1969 | Gregory | B23D 49/165 30/392 |
| 3,945,120 | A | * | 3/1976 | Ritz | B23D 49/165 30/393 |
| 5,050,307 | A | * | 9/1991 | Palm | B23D 49/162 30/392 |
| 5,555,626 | A | * | 9/1996 | Fuchs | B23D 51/16 30/392 |
| 6,249,979 | B1 | * | 6/2001 | Bednar | B23D 49/165 30/182 |

(Continued)

FOREIGN PATENT DOCUMENTS

| JP | 2008110410 A | 5/2008 |
| WO | 2010010474 A1 | 1/2010 |

OTHER PUBLICATIONS

International Search Report corresponding to PCT Application No. PCT/EP2016/079727 (6 pages).

*Primary Examiner* — Sean Michalski
(74) *Attorney, Agent, or Firm* — Greenberg Traurig, LLP (57) ABSTRACT

In accordance with one embodiment, a reciprocating saw includes a housing, a plunger at least partially positioned within the housing and configured to reciprocate with respect to the housing along a plunger axis, a wobble plate assembly operably connected to the plunger and a motor, a first guide rail supported by the housing and extending longitudinally along the plunger axis, and a spherical component in contact with the first guide rail, the spherical component and the first guide rail configured to inhibit rotation of the wobble plate assembly.

18 Claims, 5 Drawing Sheets

(56) References Cited

U.S. PATENT DOCUMENTS

| | | | | |
|---|---|---|---|---|
| 6,286,217 | B1* | 9/2001 | Dassoulas | B23D 51/16 30/220 |
| 7,127,973 | B2* | 10/2006 | Neitzell | B23D 49/165 83/34 |
| 7,637,018 | B2* | 12/2009 | Zhang | B23D 51/10 30/392 |
| 8,407,901 | B2* | 4/2013 | Oberheim | B23D 49/16 30/393 |
| 9,561,569 | B2* | 2/2017 | Rubens | B27B 19/006 |
| 9,700,949 | B2* | 7/2017 | Wang | B23D 49/162 |
| 9,833,850 | B2* | 12/2017 | Schmid | B23D 51/16 |
| 2001/0011420 | A1* | 8/2001 | Osada | B23D 49/165 30/392 |
| 2005/0016001 | A1* | 1/2005 | Griep | B23D 51/16 30/394 |
| 2005/0262710 | A1* | 12/2005 | Moreno | B23D 51/16 30/394 |
| 2008/0052923 | A1 | 3/2008 | Moreno | |
| 2008/0184569 | A1* | 8/2008 | Moreno | B23D 49/165 30/392 |
| 2011/0247847 | A1* | 10/2011 | Holmes | B23D 49/165 173/19 |

* cited by examiner

RECIPROCATING TOOL WITH LINEAR GUIDES

This application claims priority to U.S. Provisional Application No. 62/262,977, which was filed on Dec. 4, 2015, and U.S. Provisional Application No. 62/297,471 which was filed on Feb. 19, 2016, the entire contents of which are each hereby incorporated by reference herein.

FIELD

This disclosure relates to power hand tools and more specifically to reciprocating power hand tools.

BACKGROUND

Reciprocating tools that are motor driven, such as saber saws, larger reciprocating saws and the like are usually driven by electric motors that have a rotating output shaft. The rotating motion is translated into reciprocating motion for moving a saw blade or the like in a reciprocating manner. Various approaches have been developed which translate the rotational motion into reciprocating motion. A common approach is the incorporation of a wobble plate drive.

A "wobble plate" assembly is a configuration wherein a shaft has an angled portion on which an arm is mounted through a ball bearing assembly. The arm is slidingly positioned within a portion of a plunger assembly. As the angled portion of the shaft rotates, the arm translates the rotation of the shaft into a reciprocating movement of the plunger assembly. One example of a reciprocating tool which incorporates a wobble plate drive is U.S. Patent Publication No. 2011/0247847, which was published on Oct. 13, 2011, the entire contents of which are herein incorporated by reference.

As the plunger assembly moves along an axis, a significant amount of momentum is created. All of this momentum is absorbed by the tool as the plunger assembly reverses direction. Thus, a user of a reciprocating tool incorporating a wobble plate drive must contend with a powerfully vibrating device. In order to make such reciprocating tools more controllable, reciprocating tools such as the device in the '847 patent publication incorporate a counterweight which is driven by a secondary wobble plate in a direction opposite to the direction of the plunger assembly. In order to function properly, the housing enclosing the counterweight must be large enough to allow for travel of the counterweight without touching other components. Thus, while the incorporation of a secondary wobble plate and counterweight is effective, such systems can be bulky and expensive.

Moreover, the counterweight in known devices is guided by two rods. One of the rods provides primarily for guiding and aligning (eliminating the X and Y rotational degrees of freedom). The other rod is the secondary for anti-rotation (eliminating the Z rotation degree of freedom). By using the two rods, the counter balance is only allowed to slide in the X direction. The "X axis" or "X direction" as used herein refers to the direction in which a plunger reciprocates. Such a device is disclosed in the '847 patent publication.

The guide rods slide inside and are supported by guide bushings within the counterweight. There are manufacturing variations in bushing sizes and alignment, however, that cause higher friction in the sliding mechanism, generating additional non-desirable heat buildup. The heat affects efficiency and reduces the life of the mechanism.

A need exists for a reciprocating tool which reduces vibration of a wobble plate drive while reducing production of heat. A further need exists for a reciprocating tool which reduces vibration of a wobble plate drive which does not rely upon bulky assemblies. A system which reduces vibrations in a reciprocating tool while reducing costs associated with vibration reduction would be further beneficial. A system which reduces the overall size of a reciprocating tool so that it is portable and convenient to use without sacrificing the performance.

SUMMARY

In one embodiment, a reciprocating saw drive mechanism employs a wobble arm mechanism for reciprocating a spindle or plunger having a clamping mechanism for securing the blade therein. The drive mechanism employs a counter balance that is driven by the same wobble that drives the spindle and is guided by a set of rails that provide support for spherical steel/hard balls contained in the counter balance. This unique configuration replaces guide rods and provides anti rotation for the counter balance and the wobble plate in the mechanism.

In one embodiment, a reciprocating saw includes a housing, a plunger at least partially positioned within the housing and configured to reciprocate with respect to the housing along a plunger axis, a wobble plate assembly operably connected to the plunger and a motor, a first guide rail supported by the housing and extending longitudinally along the plunger axis, and a spherical component in contact with the first guide rail, the spherical component and the first guide rail configured to inhibit rotation of the wobble plate assembly.

In one or more embodiments, the spherical component is integrally formed with an anti-rotation arm of the wobble plate assembly.

In one or more embodiments, the spherical component includes a first ball bearing, the first guide rail is fixedly attached to a first side of the housing, the first ball bearing is in contact with a counterweight, and the counterweight is operably connected to an anti-rotation arm of the wobble plate assembly.

In one or more embodiments, the first ball bearing has a radius of curvature, the first guide rail has a bearing surface with a second radius of curvature, and the second radius of curvature is larger than the first radius of curvature.

In one or more embodiments, the counterweight and the first guide rail are configured such that the first ball bearing is longitudinally movable with respect to the counterweight and the first guide rail.

In one or more embodiments, a reciprocating saw includes a second ball bearing in contact with the counterweight and the first guide rail.

In one or more embodiments, a reciprocating saw includes a first pin extending between the counterweight and the first guide rail, and a second pin extending between the counterweight and the first guide rail, wherein the first ball bearing is located between the first pin and the second pin.

In one or more embodiments, a reciprocating saw includes a second ball bearing in contact with the counterweight and the first guide rail, and a third pin extending between the counterweight and the first guide rail, wherein the second ball bearing is located between the third pin and the second pin.

In one or more embodiments, the first ball bearing is at least partially positioned within a first sub-chamber.

In one or more embodiments, a reciprocating saw includes a second ball bearing at least partially positioned within a second sub-chamber and in contact with the counterweight and the first guide rail, wherein the counterweight and the first guide rail are configured such that the second ball bearing is longitudinally movable with respect to the counterweight and the first guide rail.

In one or more embodiments, the first and the second sub-chamber are defined within the counterweight.

In one or more embodiments, the first and the second sub-chamber are defined within the first guide rail.

In one or more embodiments, a reciprocating saw includes a second guide rail fixedly attached to a second side of the housing, the counterweight located between the first side of the housing and the second side of the housing, a second ball bearing in contact with the counterweight and in contact with the first guide rail, and a third ball bearing in contact with the counterweight and in contact with the second guide rail.

In one or more embodiments, each of the ball bearings, from one to four or more, is at least partially positioned within a respective receptacle in the counterweight.

In one or more embodiments, the first guide rail is configured such that the first ball bearing simultaneously contacts the first guide rail at two spaced apart locations.

In one or more embodiments, the first guide rail is configured such that the first ball bearing contacts the first guide rail solely at a single point of contact.

In one or more embodiments, the counterweight and the first guide rail are configured such that the first ball bearing and the second ball bearing are longitudinally movable with respect to the counterweight and the first guide rail, and the counterweight and the second guide rail are configured such that the third ball bearing is longitudinally movable with respect to the counterweight and the second guide rail.

DESCRIPTION

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles of the disclosure as would normally occur to one skilled in the art to which this disclosure pertains.

Figure 1:
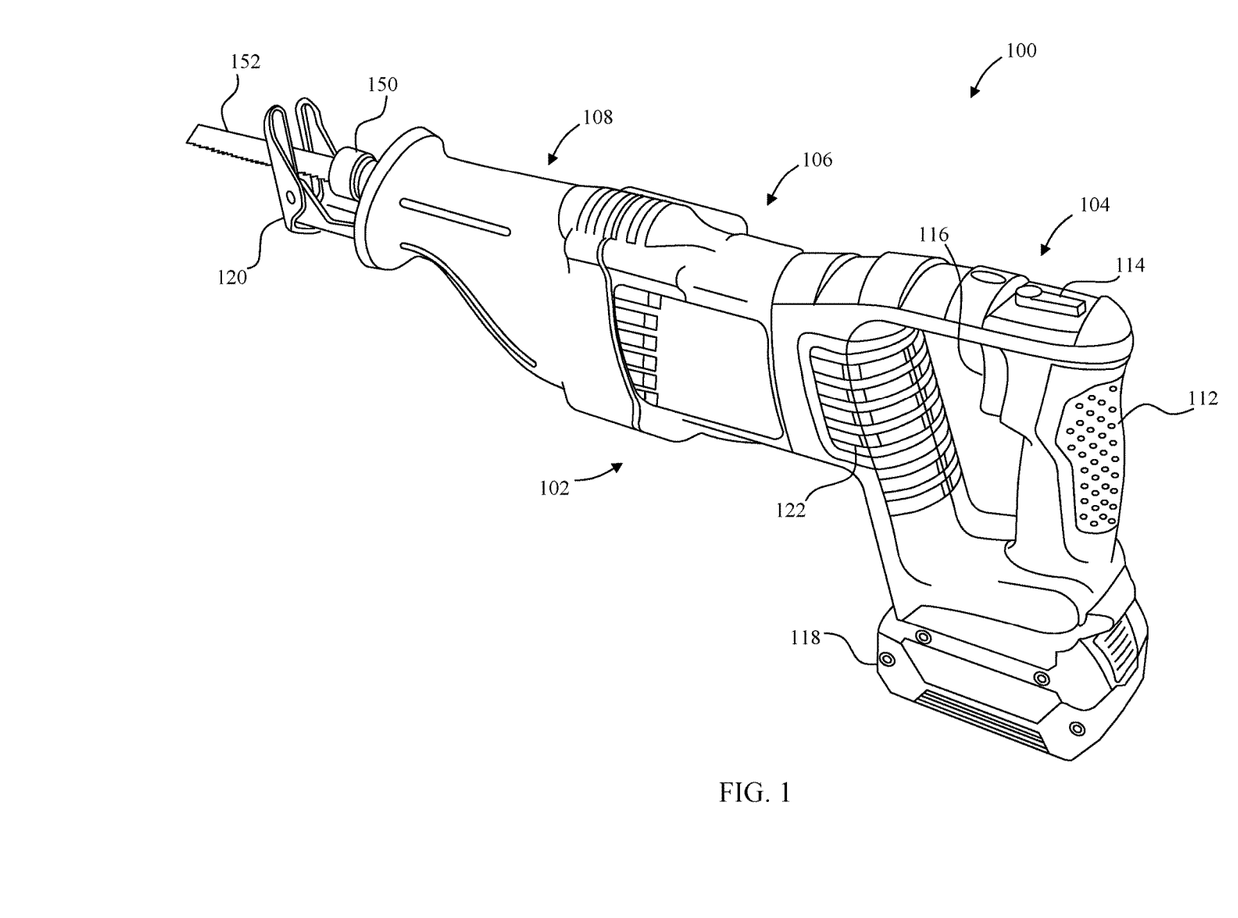
FIG. 1 depicts a side perspective view of a reciprocating tool incorporating linear guides in accordance with principles of the disclosure.

FIG. 1 depicts a reciprocating saw 100 including an outer housing 102 which includes a handle portion 104, a motor portion 106, and a nose portion 108. The handle portion 104 includes a grip 112. A dual-speed switch 114 and a variable speed trigger 116 extend from the handle portion housing 104. The handle portion 104 is configured to removably receive a battery pack 118 which in some embodiments is replaced by a corded power supply.

The nose portion 108 is shaped to allow a user to grip the tool 100 while the tool 100 is in use and in some embodiments is made from a rubber material. A foot plate assembly 120 is located forwardly of the nose portion 108.

Figure 2:
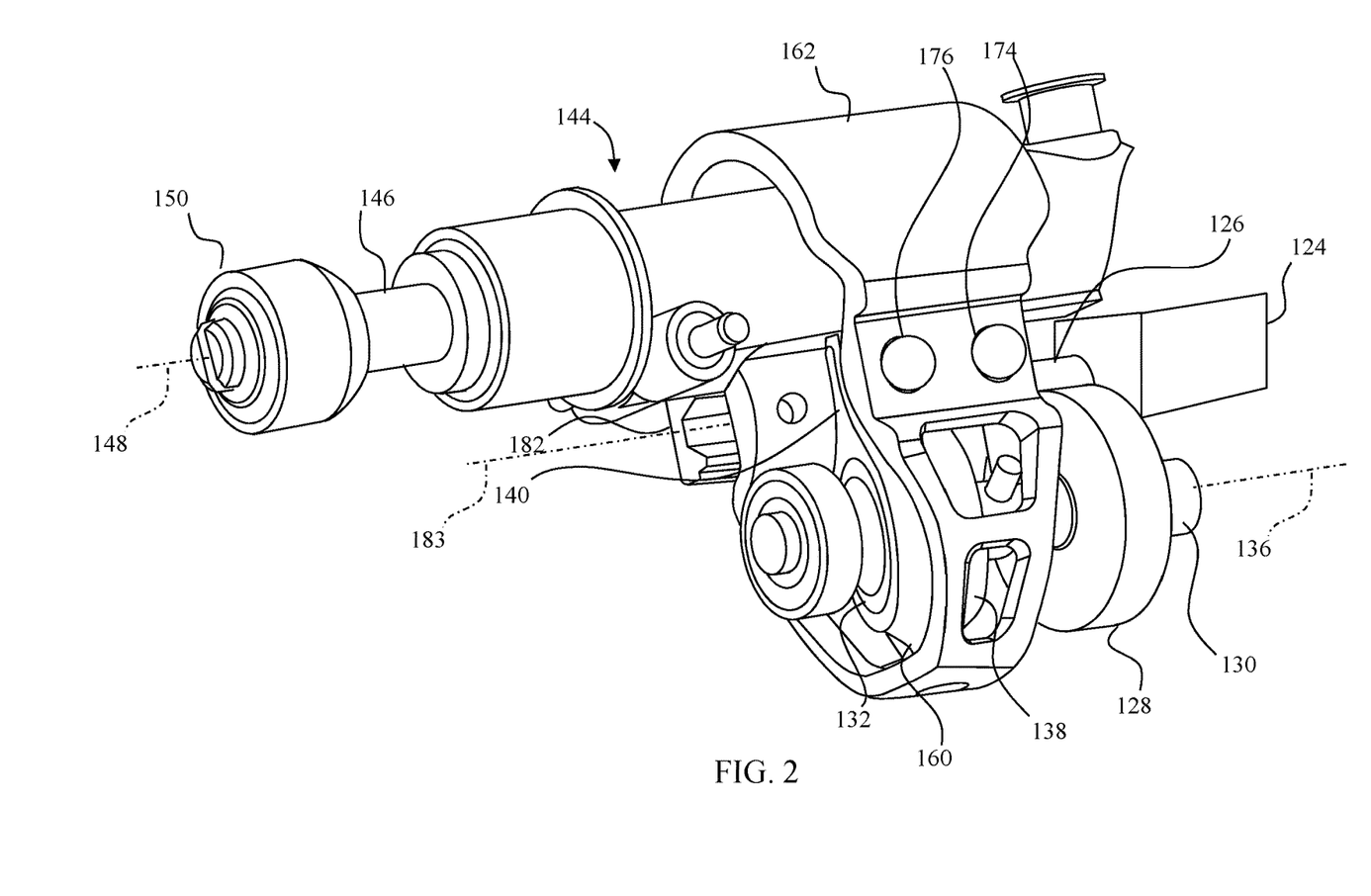
FIG. 2 depicts a simplified partial side perspective view of the tool of FIG. 1 with the housing removed and the counterweight positioned about the plunger.

The motor portion 106 includes a number of ventilation ports 122 which are used to provide cooling air to a motor 124 shown in FIG. 2. An optional noise reduction system (not shown) for reducing noise generated by the motor is positioned within the motor portion 106 to discharge unwanted noise. The motor 124 rotatably drives an output shaft 126 which is engaged with a gear 128. The gear 128 is fixedly connected to a drive shaft 130 with an offset portion 132. The drive shaft 130 rotates about an axis of rotation 136.

A wobble plate assembly 138 is rotatably positioned on the offset portion 132. The wobble plate assembly 138 includes an adaptor arm 140 which drives a plunger assembly 144 in a reciprocating motion. A plunger 146 of the plunger assembly 144 is configured to reciprocate along a plunger axis 148. A chuck assembly 150 is located at a forward portion of the plunger 146. The chuck assembly 150 releasably holds a saw blade 152 (see FIG. 1).

Figure 3:
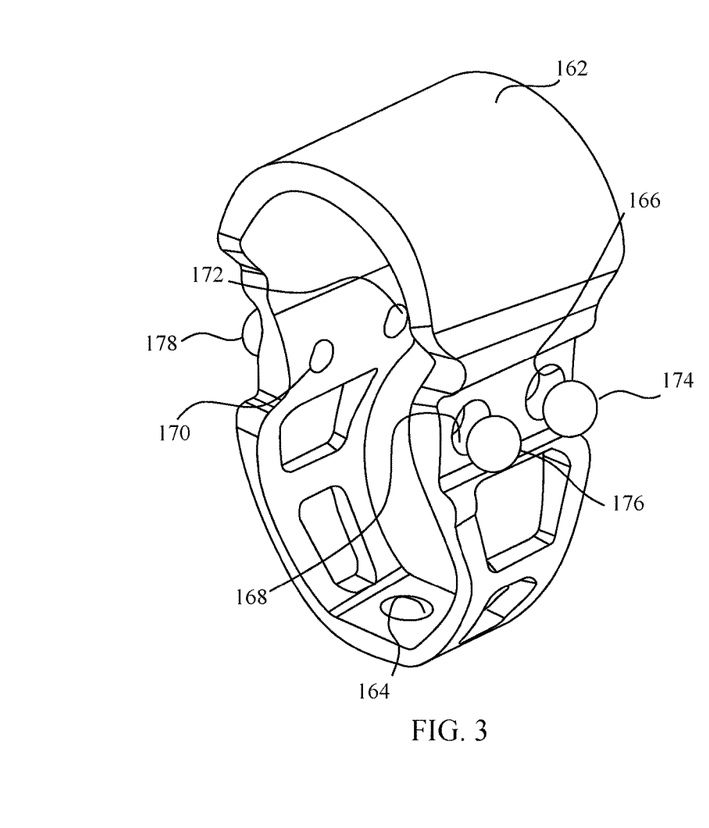
FIG. 3 depicts a side perspective view of the counterweight of FIG. 1.

The wobble plate assembly 138 further includes a counterweight arm 160 which is operably engaged with a counterweight 162. The counterweight arm 160 is pivotably received within a receptacle 164 of the counterweight 162 which is shown in FIG. 3. The counterweight 162 further includes guide receptacles 166, 168, 170, and 172. The guide receptacles 166, 168, 170, and 172 each receive a respective spherical component which in one embodiment are ball bearings 174, 176, 178, 179 (see also FIG. 4). In one embodiment, the ball bearings are made of steel. The guide receptacles 166, 168, 170, and 172 are sized to allow the respective ball bearings to roll within the guide receptacles 166, 168, 170, and 172. While shown as extending completely through the counterweight 162, in some embodiments the receptacles are simply depressions sized to partially receive a ball bearing.

Figure 4:
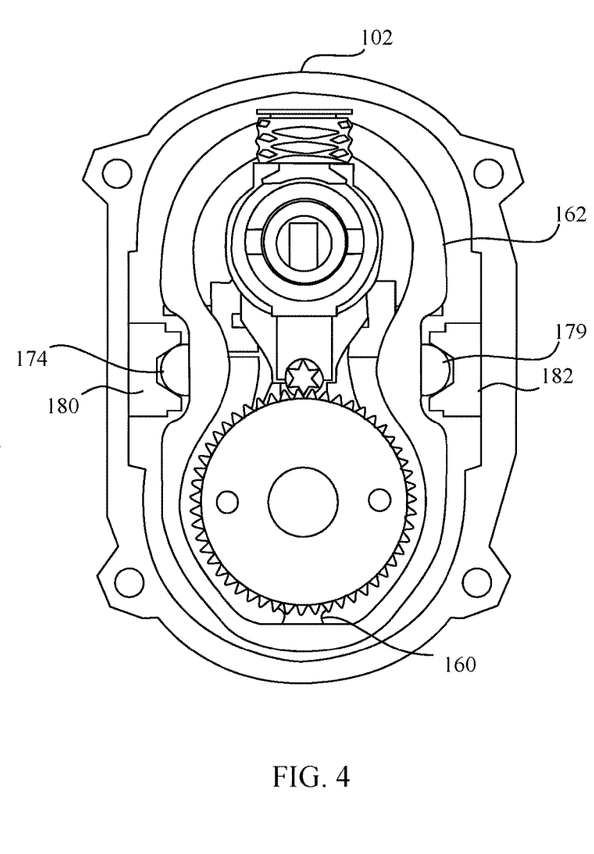
FIG. 4 depicts a partial rear plan view of the tool of FIG. 1 with the rear housing removed.

The ball bearings for the guide receptacles 166 and 168 are received within a guide rail 180 shown in FIG. 4 while the ball bearings for the guide receptacles 170 and 172 are received within a guide rail 182. The guide rails 180/182 are on opposite sides of the housing 102 and extend longitudinally along the plunger axis 148. The guide rails 180/182 are fixed to the front housing 102 either by fasteners, press fit, gluing or insert molded. Preferably, the guide rails 180/182 define a guide rail longitudinal axis which is parallel to the plunger axis 148 (see, e.g., guide rail longitudinal axis 183 of the guide rail 182 in FIG. 2). The material of the guide rails is preferably harder than the front housing material to provide a better wear surface for the rolling ball bearings while allowing for reduced weight of the housing.

In the embodiment of FIGS. 1-4, four bearings are used. In other embodiments, more or fewer are used. Preferably, at least three bearings are used with at least one bearing on a side opposite another bearing when bearings are used on both sides of the counterweight. For example, one embodiment includes only the bearings 174, 176, and 178 with the bearing 178 on a side opposite the bearings 174 and 176. Thus, two bearings serve as primary supports for guiding and aligning (eliminating the X and Y rotational degree of freedom) and the third bearing is the secondary for anti-rotation by eliminating the Z rotational degree of freedom. By providing more than three bearings, clearances between races can be reduced which improves vibration control.

The device of FIGS. 1-4 thus employs ball bearings that roll inside countersink bore features located on the outside of the counter weight and slide/roll on V-shaped guide rails attached to the inside walls of the front housing. Consequently, the counterweight is only allowed to slide in the X direction (parallel to the plunger axis 148). The ball bearing and guide configuration allows for improved control in manufacturing and requires rolling rather than sliding points of contact elements. This configuration generates a slower heat buildup in the mechanism as compared to known configurations.

Figure 5:
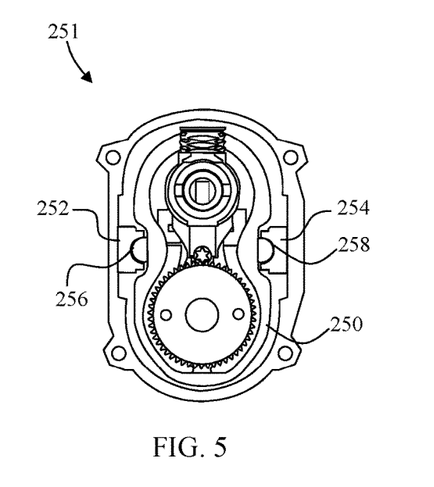
FIG. 5 depicts a cross sectional view of another described embodiment of a guide rail which in some embodiments is included in the device of FIG. 1.

While the embodiment depicted in FIGS. 2-4 provides two points of contact between each ball bearing and each guide, in some embodiments a single point of contact is provided between each of the ball bearings and the associated guide rail. By way of example, FIG. 5 depicts a counterweight 250 in a reciprocating saw 251. As depicted in FIG. 5, counterweight 250 is supported by longitudinally extending guide rails 252 and 254 through ball bearings 256 and 258, respectively. While only two ball bearings 256 and 258 are shown, three or more ball bearings are used in various embodiments. The guide rails 252 and 254 differ from the guide rails 180/182 in that they are curved so as to form an arced or a spherical bearing surface. By way of example, the radius of curvature of the bearing surfaces may be larger than the radius of curvature of the ball bearings. Accordingly, only one point of contact is formed between the surface of the bearing ball and the guide rail.

In some embodiments an arced bearing surface of a guide rail is configured to provide two points of contact with each of the ball bearings. This is accomplished in some embodiments by providing the upper arced bearing surface with a radius of curvature that is different from a radius of curvature of the lower arced bearing surface. In other embodiments, the origin of the radius of curvature of the upper arced bearing surface is offset to be either above or below the origin of the radius of curvature of the lower arced bearing surface.

In the embodiment of FIGS. 2-4, the linear guide mechanism is used with a counterweight that is driven by the same wobble that drives the plunger although other configurations are possible. The linear guide mechanism limits the movement of the counterweight to one linear direction. The counterweight thus serves as part of the anti-rotation element for the wobble. Current state of the art solutions to the anti-rotation of the wobble employ features located above the center of the wobble. In the embodiment of FIGS. 2-4, features located below the axis of rotation of the wobble shaft provide anti-rotation.

Specifically, FIG. 4 depicts ball bearings 174 and 179 which contacts the counterweight 162 which is connected to the wobble plate assembly 138 through the counterweight arm 160. Anti-rotation is thus provided at the bottom of the wobble plate assembly 138.

Figure 6:
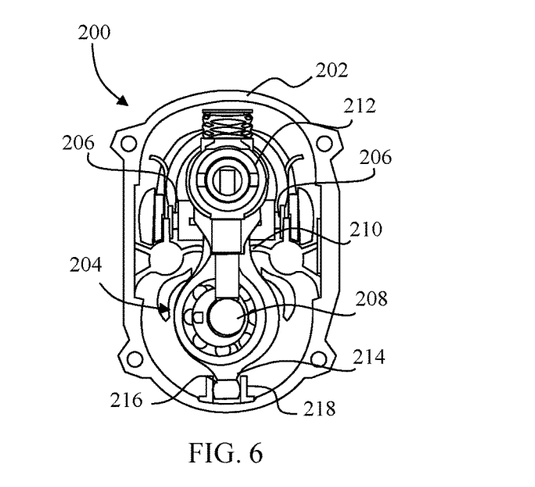
FIG. 6 depicts a partial rear plan view of a reciprocating tool similar to the tool of FIG. 1 which does not include a counterweight with the rear housing removed.

FIG. 6 depicts a reciprocating saw 200 which is similar to the reciprocating saw 100. The reciprocating saw 200 differs from the reciprocating saw 100 in that the reciprocating saw 200 does not include a counterweight. The reciprocating saw 200 includes a housing 202 which pivotably supports a plunger assembly 212 through pivot pins 206.

A wobble plate assembly 204 is rotatably positioned on a drive shaft 208. The wobble plate assembly 204 includes an adaptor arm 210 which drives a plunger assembly 212 in a reciprocating motion. The wobble plate assembly 204 further includes an anti-rotation arm 214 which includes an integrally formed spherical component 216 which is operably engaged with a longitudinally extending guide rail 218. The guide rail 218 is mounted to the housing 202 like the guide rails 180/182 are joined to the housing 102 and also extends along an axis parallel to a plunger axis. The guide rail 218 in some embodiments is formed from materials such as those discussed above for the formation of the guide rails 180/182. While depicted with flat bearing surfaces, the guide rail in some embodiments includes arced bearing surfaces such as the bearing surfaces of the guide rails 252/254.

The spherical component 216 and the guide rail 218 provide anti-rotation for the wobble in embodiments such as FIG. 5 wherein there is no counterweight. The spherical component 216 and the guide rail 218 can also, however, be incorporated into the embodiment of FIGS. 1-4. In such embodiments, the spherical component 216, or an adjacent portion of the wobble plate assembly, and the guide rail 218 drive the counterweight. The integrally formed ball bearing and guide system provides reduced friction. In one embodiment the spherical component 216 is arced about its entire circumference. In another embodiment, the spherical component is spheroidal only the portions of the spherical component which contact the guide rail 218.

Figure 7:
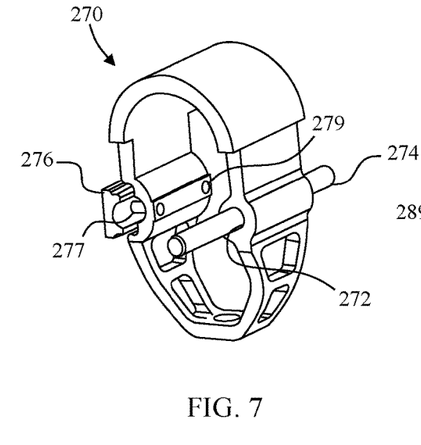
FIG. 7 depicts a side perspective view of another described embodiment of a counterweight and guide rails which can be used in the device of FIG. 1.

FIG. 7 illustrates a counterweight 270 which can be used in the reciprocating saw 100. Unlike the counterweight 162, the counterweight 270 includes a bore 272 slidably receiving a rod 274 configured to guide and align (eliminating the X and Y rotational degree of freedom) the counterweight 270. A guide rail 276 and a ball bearing (not shown) is provided with the counterweight 270. Since the guiding and aligning functions are performed by the rod 274, only one ball bearing (not shown) is provided for anti-rotation by eliminating the Z rotational degree of freedom. The counterweight 270 is configured to allow the ball bearing (not shown) to roll back and forth longitudinally within an area bounded by two pins 277/279. The ball bearing thus moves longitudinally with respect to both the guide rail 276 and the counterweight 270 in contrast to the ball bearings in the embodiment of FIG. 3 which are constrained within the guide receptacles 166, 168, 170, and 172.

Figure 8:
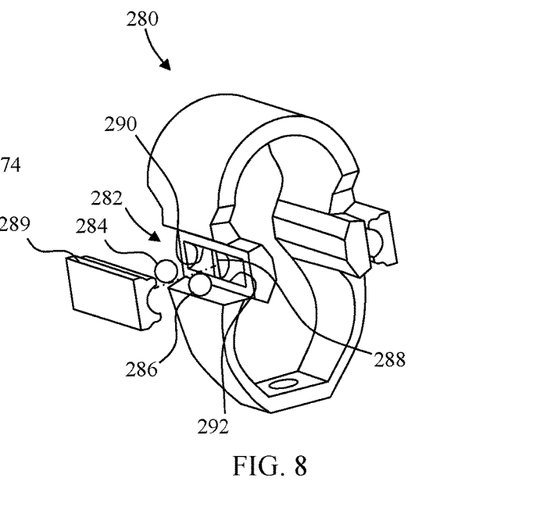
FIG. 8 depicts a side perspective partially exploded view of another described embodiment of a counterweight and guide rails which can be used in the device of FIG. 1.

FIG. 8 illustrates a counterweight 280 which can be used in the reciprocating saw 100. The counterweight 280 includes a first receptacle 282 for receiving ball bearings 284, 286 and a second receptacle on the opposite side (not shown) for receiving two ball bearings (not shown). Each receptacle 282 includes a common chamber formed by any mechanical technique and further includes a pin or, the embodiment depicted, a partition 288 formed within the receptacle for dividing or separating the chamber into sub-chambers 290 and 292. In one embodiment, the partition is molded as part of the receptacle. The partition in other embodiments is a separate component fixedly attached to inner walls of the receptacle 282 by any attachment techniques. Once the partition is formed, the chambers (e.g. chambers 290 and 292) each receive the ball bearings (e.g. 284, 286) to allow the respective ball bearings to roll longitudinally with respect to both the guide rail 289 and the counterweight 280.

Figures 9, 10, 11:
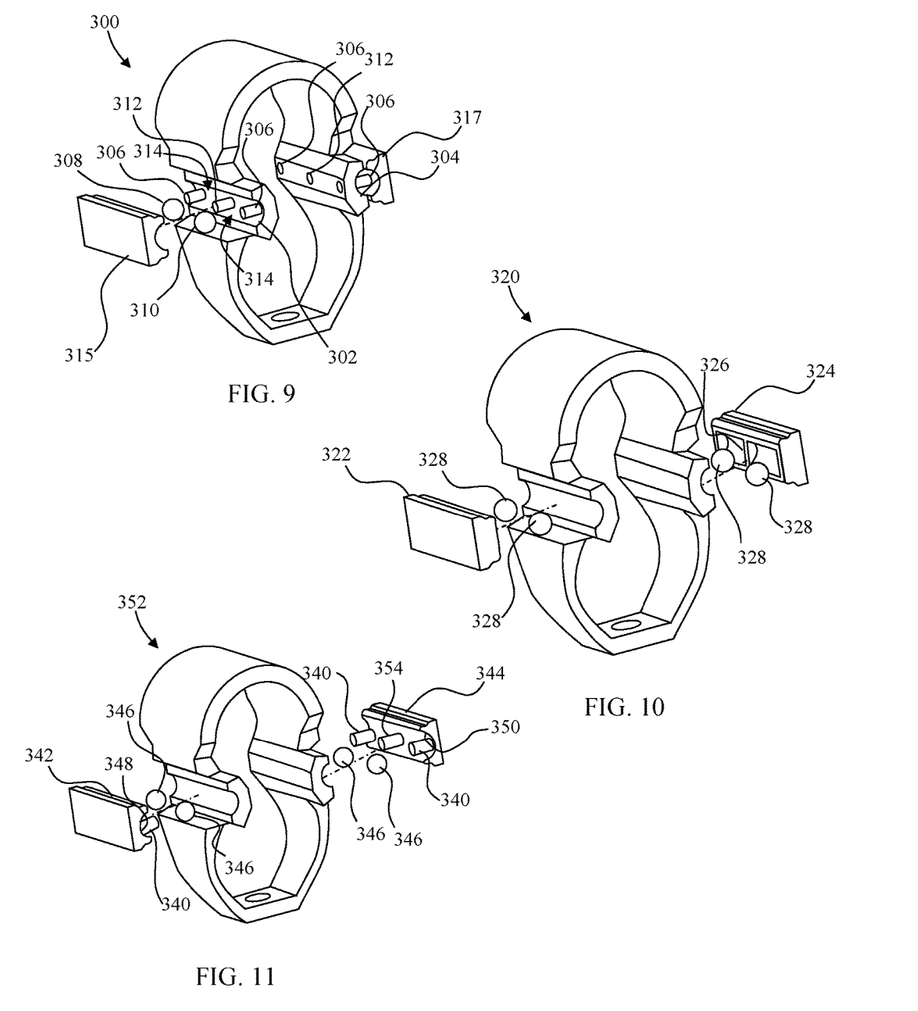
FIG. 9 depicts a side perspective view of another described embodiment of a counterweight and guide rails which can be used in the device of FIG. 1.
FIG. 10 depicts a side perspective view of another described embodiment of a counterweight and guide rails which can be used in the device of FIG. 1.
FIG. 11 depicts a side perspective view of another described embodiment of a counterweight and guide rails which can be used in the device of FIG. 1.

FIG. 9 illustrates yet another counterweight 300 that can be used in the reciprocating saw 100. The counterweight 300 includes first and second channels 302, 304. Pins 306 are formed on both ends of each channel 302, 304, defining common chambers, to keep the ball bearings 308, 310 (ball bearings in channel 304 not shown) once received by the chamber. A third pin 312 acts as a partition within the common chamber for dividing or separating the chambers into sub-chambers 314, each receiving a respective ball bearing to allow the respective ball bearings to roll longitudinally with respect to both the guide rails 315/317 and the counterweight 300.

FIG. 10 illustrates a counterweight 320 that can be used with the reciprocating saw 100. In this embodiment, guide rails 322, 324 each includes a partition 326 for separating ball bearings 328 from one another received within the common chambers and yet allowing the respective ball bearings to roll longitudinally within the chambers.

In FIG. 11, two pins 340 are formed on end portions of each of the guide rails 342, 344 to keep the ball bearings 346 contained within the channels 348, 350 of the counterweight 352 which can be used in the reciprocating saw 100. A third pin 354 acts as a partition and is also formed on the guide rails 342, 344 for separating the ball bearings 346 from one another upon being received within the common chambers and yet allowing the respective ball bearings to roll longitudinally within the chambers.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected. Moreover, those of ordinary skill in the art will recognize that features of the various embodiments can be combined with features of other embodiments in accordance with principles of the disclosure.

The invention claimed is:

1. A reciprocating saw, comprising:
a housing;
a plunger at least partially positioned within the housing and configured to reciprocate with respect to the housing along a plunger axis;
a wobble plate assembly operably connected to the plunger and a motor;
a first guide rail supported by the housing and extending longitudinally along the plunger axis;
a spherical component in contact with the first guide rail, the spherical component and the first guide rail configured to inhibit rotation of the wobble plate assembly, wherein:
the spherical component comprises a first ball bearing, the first guide rail is fixedly attached to a first side of the housing,
the first ball bearing is in contact with a counterweight, and
the counterweight is operably connected to an anti-rotation arm of the wobble plate assembly;
a second guide rail fixedly attached to a second side of the housing, the counterweight located between the first side of the housing and the second side of the housing;
a second ball bearing in contact with the counterweight and in contact with the first guide rail; and
a third ball bearing in contact with the counterweight and in contact with the second guide rail.

2. The saw of claim 1, wherein:
the spherical component is integrally formed with an anti-rotation arm of the wobble plate assembly.

3. The saw of claim 1, wherein:
the first ball bearing has a radius of curvature;
the first guide rail has a bearing surface with a second radius of curvature; and
the second radius of curvature is larger than the first radius of curvature.

4. The saw of claim 1, wherein the counterweight and the first guide rail are configured such that the first ball bearing is longitudinally movable with respect to the counterweight and the first guide rail.

5. The saw of claim 4, further comprising:
a second ball bearing in contact with the counterweight and the first guide rail.

6. The saw of claim 4, further comprising:
a first pin extending between the counterweight and the first guide rail; and
a second pin extending between the counterweight and the first guide rail, wherein the first ball bearing is located between the first pin and the second pin.

7. The saw of claim 6, further comprising:
a second ball bearing in contact with the counterweight and the first guide rail; and
a third pin extending between the counterweight and the first guide rail, wherein the second ball bearing is located between the third pin and the second pin.

8. The saw of claim 4, wherein the first ball bearing is at least partially positioned within a first sub-chamber.

9. The saw of claim 8, further comprising:
a second ball bearing at least partially positioned within a second sub-chamber and in contact with the counterweight and the first guide rail, wherein the counterweight and the first guide rail are configured such that the second ball bearing is longitudinally movable with respect to the counterweight and the first guide rail.

10. The saw of claim 9, wherein the first and the second sub-chamber are defined within the counterweight.

11. The saw of claim 9, wherein the first and the second sub-chamber are defined within the first guide rail.

12. The saw of claim 1, wherein each of the first ball bearing, the second ball bearing, and the third ball bearing is at least partially positioned within a respective receptacle in the counterweight.

13. The saw of claim 12 wherein the first guide rail is configured such that the first ball bearing simultaneously contacts the first guide rail at two spaced apart locations.

14. The saw of claim 12, wherein the first guide rail is configured such that the first ball bearing contacts the first guide rail solely at a single point of contact.

15. The saw of claim 1, wherein:
the counterweight and the first guide rail are configured such that the first ball bearing and the second ball bearing are longitudinally movable with respect to the counterweight and the first guide rail; and
the counterweight and the second guide rail are configured such that the third ball bearing is longitudinally movable with respect to the counterweight and the second guide rail.

16. The saw of claim 15, further comprising:
a first pin extending between the counterweight and the first guide rail;
a second pin extending between the counterweight and the first guide rail; and
a third pin extending between the counterweight and the first guide rail, wherein the first ball bearing is located between the first pin and the second pin and the second ball bearing is located between the second pin and the third pin.

17. The saw of claim 15, wherein:
the first ball bearing is at least partially located within a first sub-chamber defined in the first guide rail; and
the second ball bearing is at least partially located within a second sub-chamber defined in the first guide rail.

18. The saw of claim 15, wherein:
the first ball bearing is at least partially located within a first sub-chamber defined in the counterweight; and
the second ball bearing is at least partially located within a second sub-chamber defined in the counterweight.

\* \* \* \* \*